United States Patent [19]
Welch

[11] 3,850,474
[45] Nov. 26, 1974

[54] AUTOMOTIVE BODY COMPONENTS

[76] Inventor: Ralph A. Welch, 2470 Lane Rd., Columbus, Ohio 43220

[22] Filed: Mar. 10, 1972

[21] Appl. No.: 233,434

[52] U.S. Cl....... 296/31 P, 260/2.5 HA, 260/876 B, 267/140, 293/1, 293/63, 293/71 R, 296/28 R
[51] Int. Cl..... B62d 29/04, C08f 29/12, C08f 47/10
[58] Field of Search..... 260/876 B, 2.5 HA; 293/63, 293/71; 296/31 P

[56] References Cited
UNITED STATES PATENTS

| | | | |
|---|---|---|---|
| 3,294,868 | 12/1966 | Pritchard | 260/876 B |
| 3,299,174 | 1/1967 | Kuhre et al. | 260/876 B |
| 3,441,530 | 4/1969 | Bauer et al. | 260/876 B |
| 3,493,257 | 2/1970 | Fitzgerald et al. | 293/63 |

*Primary Examiner*—Wilbert J. Briggs, Sr.
*Attorney, Agent, or Firm*—Morris Fidelman

[57] ABSTRACT

Automotive body components having high impact strength and made of a composition comprising a blend of polystyrene-polybutadiene-polystyrene and isotactic polypropylene and/or polyethylene, the components having elastic memories and adapted to resist aging and weather.

12 Claims, 6 Drawing Figures

AUTOMOTIVE BODY COMPONENTS

This invention relates to new body components for cars, specifically bumpers, fenders, door panels and quarter panels.

One of the problems with present day steel body components on automobiles has been the lack of any elasticity of the components. I.e., when the auto strikes or is struck by another object, whether it be another car, sign, post, etc., the component of the car coming into contact with the other object at the point of impact does not return to its initial position prior to the impact. Even minor impacts, at five to ten miles per hour produce extensive damage. Added to these problems are the weight of metal automotive components, the cost and the constant oxidation of the metal which commences within a short time after production of the car.

The instant invention overcomes the problems enumerated above, especially those concerning impact. The components made of the compositions later to be described demonstrate an elastic memory up to a point far beyond that of metal. Obviously the components, whether they be bumpers, fenders, door or quarter panels, etc. are placed on the auto so that they may flex or bend somewhat at impact. It is preferred that the areas of these components which are likely to absorb an impact are not secured to the frame at that point. The expected impact area of the component is unattached and free to bend to cushion the impact. The component is attached to the frame at some other point or location.

Accordingly, it is an object of this invention to provide new plastic body components for automobiles.

It is a further object of this invention to provide body components for automobiles made of a composition comprising a blend of polystyrene-polybutadiene-polystyrene and isotactic polypropylene and/or polyethylene.

A further object of this invention is to provide plastic body components having elastic memories for use on automobiles.

These and other objects of the invention will become apparent when reference is had to the accompanying specification and drawings in which.

Figure 1:
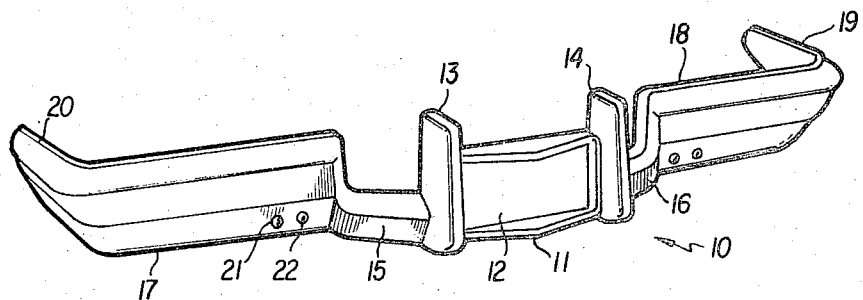
FIG. 1 is a perspective view of the front of an auto bumper.
Figure 2:
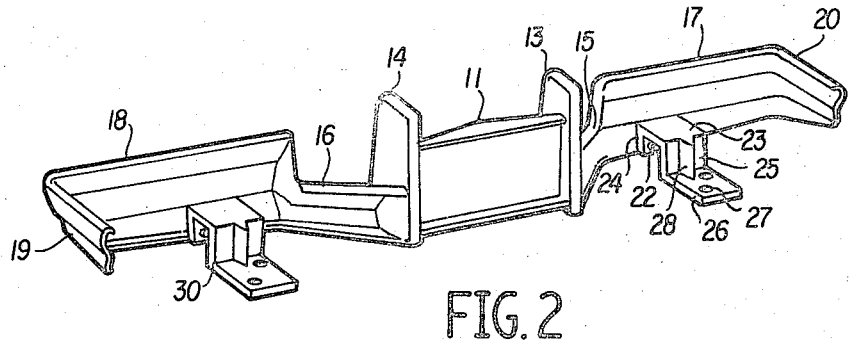
FIG. 2 is a rear perspective view of the bumper of FIG. 1.

Referring now to FIG. 1, there is shown an automobile bumper generally designated as 10. It consists of a main center section 11 especially designed for receiving a license plate and having a flat planar surface 12. On each side of portion 11 are bumper guards 13 and 14. The bumper then extends through narrow portions 15,16 to wide portions 17,18. Portions 18 and 19 have flange sections 19,20 thereon respectively, which are adapted to wrap around the front corners of the automobile. Bolts 21,22 are shown in FIG. 1 and they attach brackets such as 23 and 30, as shown in FIG. 2, to the bumper 10.

Brackets 23 and 30 are identical and only the former is described. Bracket 23 has a flange portion 24 which has holes (not shown) for receiving bolts 21,22. Generally parallel to portion 24 is a depending portion 25 which connects with mounting flange 26 having holes such as 27 for receiving bolts to mount bumper 10 to the frame of a vehicle. A V-shaped portion 28 is integrally molded with portions 25 and 26 and provides a reinforcing or web portion stiffener. The entire bracket 23 is integrally molded of the composition described. When bumper 10, which can be of standard metal construction, another plastic synthetic material or made of the composition previously mentioned is struck, the brackets will bend backward upon impact and then recover to within a degree or two of their initial position. Thus the bumper itself and the frame are not distorted, which has been the cause of most accident claims in low speed collisions. When such a bending occurs, the web portion 28 may fracture slightly at its base. The recovery of the bracket, will tend to bend at the juncture of portions 25 and 26 and along the plane of portion 25. This "elastic memory" of the bracket is due to the composition of the material used and of the particular T-shaped configuration which builds up a torquing return force using a variety of plastic compositions which will be discussed later. Also, the particular preferred compositions employed in the automotive components such as brackets will produce this result without the accompanying T-shape shown in FIGS. 1 and 2.

Figure 3:
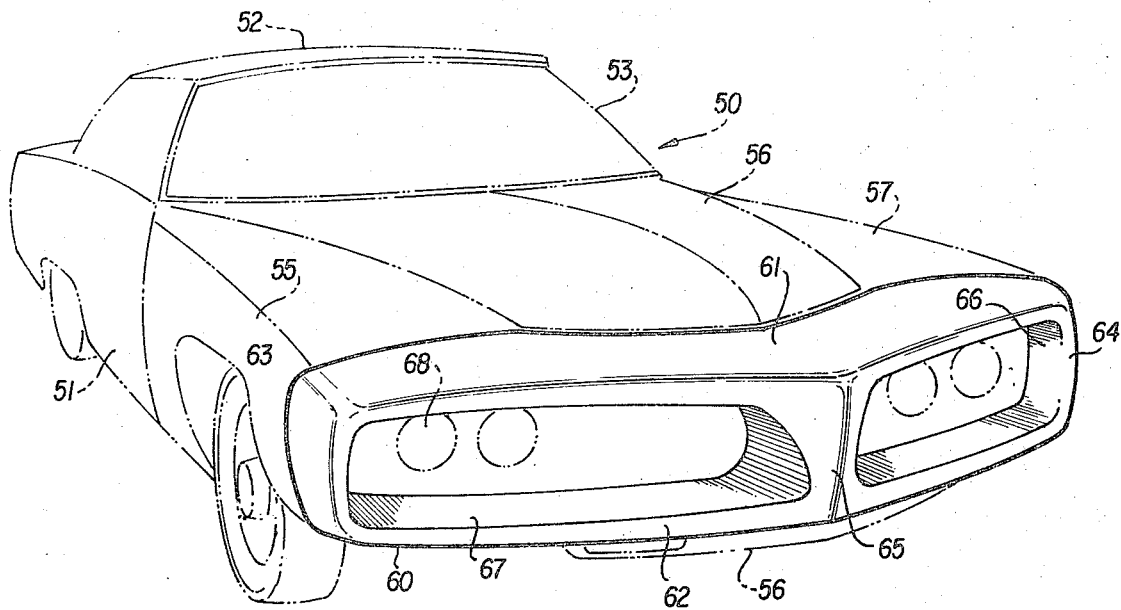
FIG. 3 is a perspective view of an auto having a molded bumper piece thereon.
Figure 4:
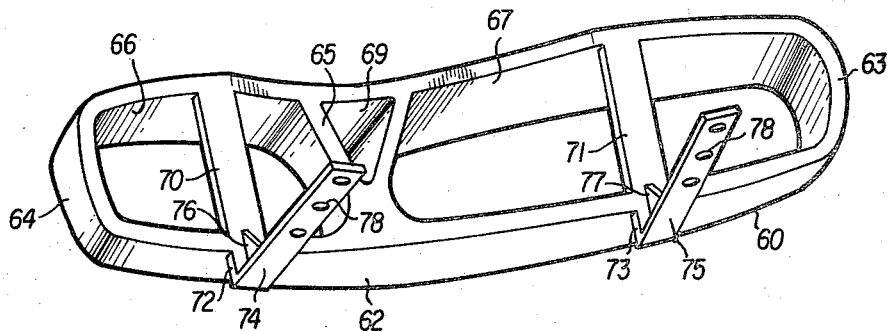
FIG. 4 is a rear perspective view of the molded bumper piece of FIG. 3.

Referring now to FIGS. 3 and 4 there is shown a molded front section 60 used on many recent vintage automobiles. The component comprises upper longitudinal portion 61 and lower longitudinal portion 62, both of which are slightly V-shaped in plan view. Connecting the two spaced longitudinal portions are end portions 63,64 and center section 65 which is internally relieved as at 69. The internal open areas of section 60 have smooth internal surfaces such as 66 and 67.

The section 60 is mounted on the front of a vehicle generally designated as 50 in FIG. 3 and having a top 52, windshield 53, hood 56, fenders 55,57, wheels 63 and rear panel 51.

The section 60 may be directly mounted onto the front of automobile 50 or may be attached by brackets as shown in FIG. 4.

The section 60 is shown in FIG. 4 as having a pair of vertical sections 70,71 adapted to lie to one side of headlights 68 (FIG. 3) and accompanying depending portions 72,73 respectively. Attached at right angles to depending portions 72,73 73 are bracket portions 74,75 respectively, having mounting holes 78 therein. Triangularly shaped portions 76 and 77 connect the depending portions 72,73 73 and bracket portions 74,75 respectively. The portions 76,77 extend almost to sections 70 and 71, respectively.

When section 60 is impacted, the whole section bends back along sections 70 and 71 and at the junctures of portions 72 and 74 and 73 and 75. The members 76 and 77 act as webs to distribute the bending over sections 70 and 71.

The section 60 is preferably molded as a unit with portions 72, 73, 74, and 75 as an integral part thereof.

Figure 5:
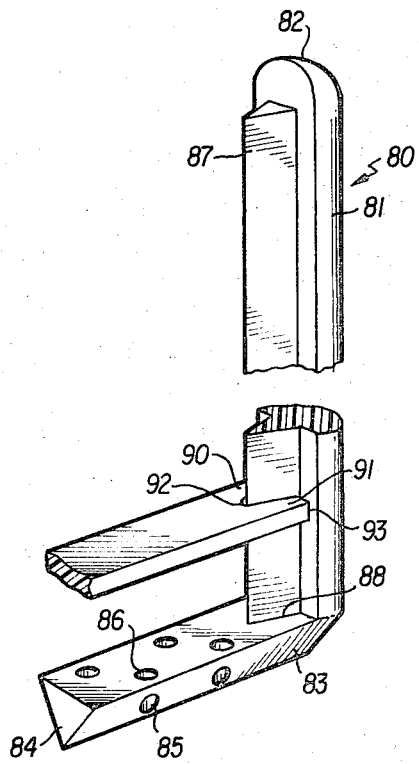
FIG. 5 is a perspective view of a plastic bumper guard showing attachment features.

FIG. 5 shows a bumper guard generally designated as 80 which may be joined to a bumper or mounted separately to the frame as shown. It consists of a vertical member 81 having a curved face and rounded top 82. Integral with member 81 is bracket portion 83 of triangular shaped configuration with mounting holes 85,86 86 therein for receiving bolts or rivets, mounting the guard to the frame of a vehicle.

A web 87 extends from portion 83 at juncture 88 up the rear planar face of member 81 to a joint short of the top 82. Web 87 is wedge-shaped as shown but can be of any configuration and is integral with member 81.

A support member extends generally parallel to portion 83 and has a face 93, a notched area 92 and tine portions 90 and 91 for surrounding the web 87. The support member is adapted to reinforce the lower portion of member 81 when it is impacted at a point on its curved face above the plane of the support member. The bending of member 81 commences at the point or area of engagement of web 87 with notched area 92 and extends up along the member 81.

Figure 6:
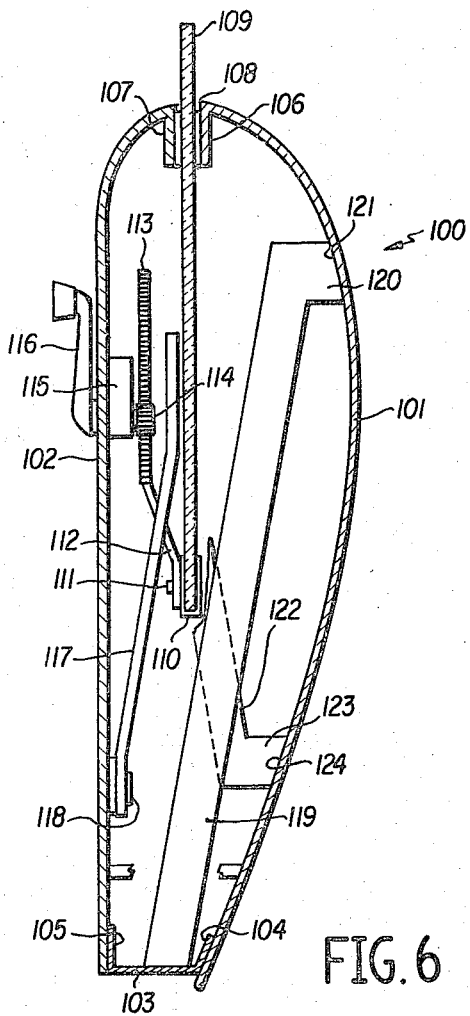
FIG. 6 is a cross-sectional view of an auto door having a plastic door panel.

FIG. 6 shows the use of the material in a door panel and is generally designated as 100. An outer door panel 101 made of plastic synthetic material is positioned opposite an inner door panel 102 made of conventional materials such as steel or aluminum. A base joinder plate 103 having upwardly extending flanges 104 and 105 secures the panels together. Other members (not shown) are used to "box" the door, such as end panels and the like.

The upper extremities of door panels 101 and 102 have flange portions 106 and 107 respectively, which form channel 108 for window pane 109. The bottom of pane 109 rests in a conventional runner 110 which is pivotally attached to crank pin 111 and crank arm 112. Runner 110 also engages conventional slides or guides such as 117, held in place by bolt 118. The end of crank arm 112 has a rack 113 thereon adapted to be moved by pinion 114 on window crank support 115. A window knob 116 is directly connected to pinion 114 so that an occupant of the vehicle may crank the window up or down. The remainder of the window supporting structure is not shown but can be of any conventional construction.

Braces 119 and 112 reinforce the outer door panel 101 and are constructed of the material described hereinafter and have angled portions such as 123 and 120 for attachment to panel 101. The braces are attached to the panel 101 at 121 and 124 in any conventional manner. The other ends of braces 119 and 122 are attached to the inner structure or base of the door in any conventional manner, the only requirement being that the connection be rigid.

The panel 101 may also be made of the material later described, as well as the braces. When panel 101 is struck, bending takes place along the length of braces 119 and 122. The supporting braces, bumpers or body panels are formed from a synthetic plastic material having the requisite properties of elastic memory, aging and weather resistance. The block copolymers forming the impact improving component of these compositions is described in U.S. Pat. No. 3,265,765.

Specific materials that are satisfactory include high density polyethylene, blends of high density polyethylene (HDPE) with up to about 50 percent by weight of poly mono alpha-alkenyl arenes-conjugated diene block copolymers and such blends with isotactic polypropylene, the isotactic polypropylene being utilized in varying proportions up to about 75 percent by weight in proportion to the amount of poly mono alpha-alkenyl arenes conjugated diene block copolymer alone or in combination with polyethylene. If the amount of the poly mono alpha-alkenyl arnes conjugated diene block copolymer used is less than 25 percent by weight, a proportional amount of polyethylene should be added so that the proportion by weight of polypropylene does not exceed 75 percent. Particularly preferred are blends of about 25 to about 75 percent (by weight) of isotactic polypropylene with about 25 to 75 percent (by weight) of the poly mono alpha-alkenyl arenes-conjugated diene block copolymers. Isotactic polypropylene (PP) is fully described in U.S. Pat. No. 3,383,375 while the block copolymers are fully described in U.S. Pat. No. 3,459,830.

The plastic compositions may include other resins as well as compatible extenders, filler, dyes and pigments, the latter being described also in U.S. Pat. No. 3,459,830. For density control, one or more blowing agents may be incorporated into the blend, such agents, e.g., sodium carbonate, being of such in nature as to leave an inert residue after blowing.

The elastomers used in the panels or supports may be compounded with rubber compounding materials such as pigments (e.g., carbon blacks, titanium dioxide, etc.) and particularly with compatible extending oils in amounts up to 100 PHR (parts by weight per hundred of rubber). They may be modified, on the other hand, with certain restricted proportions of incompatible mold lubricants for the purpose of improving their molding characteristics. Compatible extender oils normally comprise cyclic hydrocarbon oils, especially hydrocarbon oils having a relatively high naphthenic hydrocarbon content. The compositions of the body components may be adjusted with respect to physical properties by the incorporation of 1–100 parts by weight per 100 parts of block copolymer of a polyvinyl arene such as polystyrene or poly alpha methyl styrene. These may have any required crystal grade polystyrenes, high impact polystyrenes, etc.

The panels or supports are formed by conventional mixing of the plastic composition components, loading and blending the composition in a heated extruded, and injection molding. The extruder is heated above the melt point and the mold is chilled to maintain solidification temperatures.

A specific example of forming a body panel or bumper component in accordance with the instant invention comprises blending at room temperatures 50 percent by volume isotactic polypropylene (PP) with 50 percent by volume polystyrene-polybutadiene-polystyrene (PBP) block copolymer composition, the latter including about 25–70 PHR of extender oil, about 25–100 PHR polystyrene and about 15 PHR fillers (the PBP is fully described in U.S. Pat. No. 3,459,830 discussed above). Incorporated into this blend is one percent by weight (based on the combined weights of polypropylene and PBP block polymer composition) of Celogen AZ (nitrogen blowing agent by Naughatuck Chemical, Division of U.S. Rubber Company) and 2 percent by weight titanium dioxide pigment. The blend is fed to and melted in a standard heated screw extruder maintained at 320°F. where, after being injected into the chilled mold, it is maintained at 40–150°F. for a time period of 2 ½ to 3 ½ minutes. The resultant solidified components, after deburring, can be drilled for attachment to the remainer of the vehicle and can be painted.

Other specific examples of compositions include (by weight) 25 percent of polystyrene-polybutadiene-polystyrene (PBP) with 75 percent of high density polyethylene (HDPE); 50 percent of PBP with 50 percent of HDPE; 25 percent PBP with 37 ½ percent of PP and 37 ½ percent of HDPE; and 50 percent PBP with 25 percent PP and 25 percent HDPE. The block copolymers forming the impact improving component of these compositions is described in U.S. Pat. No. 3,265,765.

Thus, the use of the composition just described as a material for the various components of automobiles which comprise this invention is enabling of the performance of the various embodiments shown and described.

I claim:

1. A molded impact-resistant automotive body component comprising a first portion adapted to be located in the area of probable impact and an attachment portion and means integral with said first portion, said component having an elastic memory whereby it can be impacted and return to its initial position, said component adapted to resist aging and weather, said component being made of a composition comprising a blend of 50 percent by volume of isotactic polypropylene and 50 percent by volume polystyrene-polybutadiene-polystyrene block copolymer composition.

2. A component as in claim 1 wherein said composition comprises about 25–100 PHR polystyrene.

3. A component as in claim 1 wherein said composition further comprises about 25–75 PHR of extender oil, about 25–100 PHR of polystyrene, about 15 PHR of fillers, one percent by weight of a nitrogen blowing agent and two percent by weight titanium dioxide pigment.

4. A component as in claim 1 wherein said component is a bumper.

5. A component as in claim 4 wherein said bumper is shaped so as to merge with the fenders and hood components of an automobile to provide a smooth continuous surface between said components.

6. A component as in claim 1 wherein said component is a fender.

7. A molded impact-resistant automotive body component comprising a first portion adapted to be located in the area of probable automotive impact and an attachment portion and means integral with said first portion, said component having an elastic memory whereby it may be impacted by another object or automobile and return to its initial position, said component adapted to resist aging and weather and being made of a composition comprising a blend of about 10 percent by volume of poly-mono-alpha-alkenyl arenes-conjugated dienes block copolymer and about 45 percent by volume of isotactic polypropylene and about 45 percent by volume of polyethylene.

8. A component as in claim 7 wherein said composition also includes a compatible extender oil.

9. A component as in claim 7 wherein said polyethylene is a high density polyethylene.

10. A cured molded impact-resistant automobile body component comprising a first portion adapted to be located in the area of probable impact on an automobile and an attachment portion and means integral with said first portion, said component having an elastic memory whereupon it can be impacted and return to its initial position, said component adapted to resist aging and weather and being made of a composition comprising a blend of isotactic polypropylene, polyethylene and from 10–50 percent by volume polystyrene-polybutadiene-polystyrene block copolymer composition.

11. A component as in claim 10 wherein said composition further comprises about 25–100 PHR polystyrene.

12. A component as in claim 10 wherein said component is a bumper and said attachment means comprises two brackets integral with said attachment area.

* * * * *